United States Patent
Xie

(10) Patent No.: US 11,431,522 B2
(45) Date of Patent: Aug. 30, 2022

(54) METHOD AND APPARATUS FOR CONTROLLING ELECTRONIC DEVICE

(71) Applicant: BEIJING XIAOMI MOBILE SOFTWARE CO., LTD., Beijing (CN)

(72) Inventor: Yan Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 98 days.

(21) Appl. No.: 16/692,588

(22) Filed: Nov. 22, 2019

(65) Prior Publication Data

US 2020/0382336 A1 Dec. 3, 2020

(30) Foreign Application Priority Data

May 31, 2019 (CN) .......................... 201910472137.X

(51) Int. Cl.
*H04L 12/28* (2006.01)
*H04L 12/12* (2006.01)
(Continued)

(52) U.S. Cl.
CPC .......... *H04L 12/2829* (2013.01); *H04L 12/12* (2013.01); *H04L 12/282* (2013.01);
(Continued)

(58) Field of Classification Search
CPC ............... H04L 12/2829; H04L 12/282; H04L 12/2809; H04L 12/2834; H04L 12/2821; H04L 12/2832; H04L 12/2814; H04L 12/12; H04L 67/125; H04W 4/023; H04W 4/06; H04M 1/72403; H04M 1/72463;
(Continued)

(56) References Cited

U.S. PATENT DOCUMENTS 9,848,286 B2 * 12/2017 Lee ..................... H04W 48/16
10,262,648 B2 * 4/2019 Lu ............................ H04B 1/10
(Continued)

FOREIGN PATENT DOCUMENTS

CN 103514039 A 1/2014
CN 103914343 A 7/2014
(Continued)

OTHER PUBLICATIONS

European Search Report in the European application No. 19211867.7, dated Mar. 24, 2020.
(Continued)

*Primary Examiner* — Arvin Eskandarnia
*Assistant Examiner* — Chhian (Amy) Ling
(74) *Attorney, Agent, or Firm* — Syncoda LLC; Feng Ma

(57) ABSTRACT

A method for controlling an electronic device includes: responsive to that a starting operation over a controlled electronic device is detected, a target electronic device at a distance that is within a preset distance away from the controlled electronic device is determined; a working mode of the target electronic device is determined; and responsive to that the working mode of the target electronic device is matched with a first preset working mode, a working mode of the controlled electronic device is adjusted to a second preset working mode to avoid interference from the controlled electronic device to use of the target electronic device.

20 Claims, 10 Drawing Sheets

(51) Int. Cl.
*H04L 67/125* (2022.01)
*H04W 4/02* (2018.01)
(52) U.S. Cl.
CPC ...... *H04L 12/2809* (2013.01); *H04L 12/2814* (2013.01); *H04L 12/2821* (2013.01); *H04L 12/2832* (2013.01); *H04L 12/2834* (2013.01); *H04L 67/125* (2013.01); *H04W 4/023* (2013.01)
(58) Field of Classification Search
CPC ......... H04M 2250/06; H04M 2250/10; H04M 1/7243; H04M 1/72454; H04M 1/72457; H04M 1/72484
See application file for complete search history.

(56) References Cited

U.S. PATENT DOCUMENTS

| | | | | |
|---|---|---|---|---|
| 2015/0296599 | A1* | 10/2015 | Recker | H05B 47/16 315/153 |
| 2016/0054023 | A1* | 2/2016 | Baker | H05B 47/115 307/31 |
| 2016/0327983 | A1 | 11/2016 | Wang et al. | |
| 2017/0125035 | A1 | 5/2017 | Gao et al. | |
| 2017/0126423 | A1* | 5/2017 | Jia | H04L 12/2823 |
| 2018/0091614 | A1* | 3/2018 | Xie | H04M 19/044 |
| 2018/0109582 | A1* | 4/2018 | Xie | H04L 65/604 |
| 2018/0191891 | A1 | 7/2018 | Zhao | |
| 2020/0008056 | A1* | 1/2020 | Wu | H04W 52/36 |
| 2020/0341611 | A1* | 10/2020 | Xu | G06F 3/04842 |

FOREIGN PATENT DOCUMENTS

| | | |
|---|---|---|
| CN | 104869211 A | 8/2015 |
| CN | 104898446 A | 9/2015 |
| EP | 3163569 A1 | 5/2017 |

OTHER PUBLICATIONS

First Office Action of the Chinese application No. 201910472137.X, dated Jun. 1, 2020.

* cited by examiner

METHOD AND APPARATUS FOR CONTROLLING ELECTRONIC DEVICE

CROSS-REFERENCE TO RELATED APPLICATION

This application claims priority to Chinese patent application No. 201910472137.X filed on May 31, 2019, the disclosure of which is hereby incorporated by reference in its entirety.

BACKGROUND

Electronic devices such as smart mobile communication terminals and pads have become indispensable in daily life of users. When an electronic device is used, sound may be produced along with the running of part of functions of the electronic device, for example, sound of notification prompting and sound of multimedia playing.

SUMMARY

The present disclosure generally relates to the technical field of control, and more particularly, to a method and apparatus for controlling an electronic device.

This summary is provided to introduce a selection of aspects of the present disclosure in a simplified form that are further described below in the Detailed Description. This summary is not intended to identify key features or essential features of the claimed subject matter, nor is it intended to be used to limit the scope of the claimed subject matter.

According to a first aspect of the embodiments of the present disclosure, a method for controlling an electronic device is provided, which may include that:

responsive to that a starting operation over a controlled electronic device is detected, a target electronic device at a distance that is within a preset distance away from the controlled electronic device is determined;

a working mode of the target electronic device is determined; and responsive to that the working mode of the target electronic device is matched with a first preset working mode, a working mode of the controlled electronic device is adjusted to a second preset working mode to avoid interference from the controlled electronic device to use of the target electronic device.

In an embodiment, the operation that the target electronic device at the distance that is within the preset distance away from the controlled electronic device is determined may include that:

at least one electronic device at a distance that is within the preset distance away from the controlled electronic device is determined; and a friend electronic device is determined from the determined at least one electronic device as the target electronic device, and/or a pre-registered smart device among the determined at least one device is determined as the target electronic device, the friend electronic device being an electronic device which is preset in at least one preset Application (APP) and has a preset authority.

In an embodiment, the operation that the target electronic device at the distance that is within the preset distance away from the controlled electronic device is determined may include that:

at least one electronic device at a distance that is within the preset distance away from the controlled electronic device is determined; and an electronic device meeting any one of the following conditions is determined from the determined at least one device as the target electronic device:

for an account or number in a login status in a contact list in a preset APP installed in the controlled electronic device, an electronic device where the preset APP corresponding to the account or the number is installed, an electronic device of which a frequency of contact or connection with the controlled electronic device meets a preset contact or connection frequency condition, and a smart device in an on status.

In an embodiment, the operation that the working mode of the target electronic device is determined may include that:

working mode report information uploaded by the target electronic device is downloaded from a working mode server, and the working mode of the target electronic device is determined according to the working mode report information; or, working mode broadcast information broadcast by the target electronic device is received, and the working mode of the target electronic device is determined according to the working mode broadcast information; or, working mode request information is sent to the target electronic device to request the target electronic device to return working mode feedback information in response to the working mode request information, and the working mode of the target electronic device is determined according to the working mode feedback information.

In an embodiment, the method may further include that:

a device-to-device distance between the controlled electronic device and an electronic device in a same target network segment with the controlled electronic device is acquired;

or, when a position of the controlled electronic device is within a preset position range, a device-to-device distance between the controlled electronic device and another electronic device is acquired.

In an embodiment, detection of the starting operation over the controlled electronic device may include that:

an unlocking or wakeup operation over the controlled electronic device is detected;

or, an unlocking or wakeup operation over the controlled electronic device is detected and starting of the controlled electronic device responsive to the unlocking or wakeup operation is completed.

According to a second aspect of the embodiments of the present disclosure, an apparatus for controlling an electronic device is provided, which may include:

a processor; and a memory configured to store an instruction executable by the processor, wherein the processor may be configured to:

responsive to that a starting operation over a controlled electronic device is detected, determine a target electronic device at a distance that is within a preset distance away from the controlled electronic device;

determine a working mode of the target electronic device; and responsive to that the working mode of the target electronic device is matched with a first preset working mode, adjust a working mode of the controlled electronic device to a second preset working mode to avoid interference from the controlled electronic device to use of the target electronic device.

According to a third aspect of the embodiments of the present disclosure, a computer-readable storage medium is provided, in which a computer instruction has been stored, the instruction being executable by a processor to implement the operations of any method in the first aspect of the embodiments of the present disclosure.

It is to be understood that the above general descriptions and the following detailed descriptions are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1A:
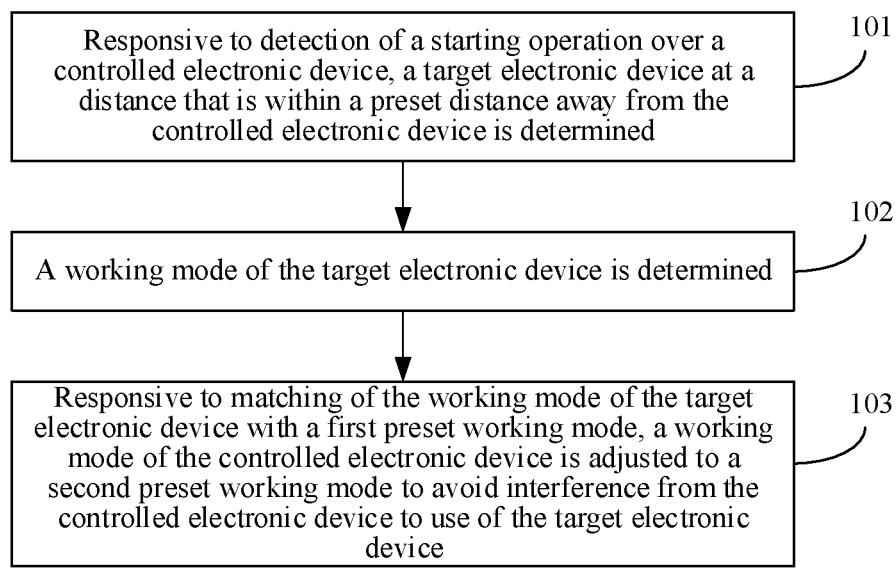
FIG. 1A is a flowchart illustrating a method for controlling an electronic device according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments but not intended to limit the present disclosure. It is also to be understood that term "and/or" used in the present disclosure refers to and includes one or any or all possible combinations of multiple associated items that are listed.

It is to be understood that "first," "second" and similar terms used in the specification and claims of the present disclosure are not to represent any sequence, number or importance but only to distinguish different parts. Likewise, similar terms such as "a/an," "the" and a plural form do not represent a number limit but represent "at least one". Terms like "include" or "comprise" refer to that an element or object appearing before "include" or "comprise" covers an element or object and equivalent thereof listed after "include" or "comprise" and does not exclude another element or object.

Along with rapid development of sciences and technologies and improvement of living standards of people, electronic devices such as smart mobile terminals and pads have become indispensable products in daily life of people. When an electronic device is used, the electronic device, if being in a working mode, may send different signals, for example, a sound signal, a light signal or an electromagnetic signal. In recent years, the types and the number of electronic devices have gradually increased for people. Consequently, when a user uses an electronic device which is in an improper working mode, the transmitted signals may interfere with the use of another electronic device by the same user or the use of an electronic device by another user. For example, if a ring tone of a mobile communication terminal is too loud, the loud sound may interfere the same user or other users from playing an audio file with a music player, thereby degrading user experience.

In the embodiments of the present disclosure, a target electronic device at a distance that is within a preset distance away from a controlled electronic device may be determined responsive to detection of a starting operation over the controlled electronic device; a working mode of the target electronic device may be determined; and responsive to that the working mode of the target electronic device is matched with a first preset working mode, namely a working status of the target electronic device in the first preset working mode may be influenced by the controlled electronic device that is not in a second preset working mode, a working mode of the controlled electronic device may be adjusted to the second preset working mode to avoid interference from the controlled electronic device to use of the target electronic device. Therefore, the working mode of the controlled electronic device can be controlled when the controlled electronic device may influence use of the target electronic device, thereby reducing influence from the controlled electronic device to use of the target electronic device as much as possible and further improving user experience.

Some embodiments of the present disclosure provide a method for controlling an electronic device, which may be applied to a terminal or smart device such as a mobile phone, a mobile computer, a pad, a television, a smart lamp, a smart sound and a smart wearable device.

As shown in FIG. 1A, the method includes the following operation 101 to operation 104.

In the operation 101, responsive to that a starting operation over a controlled electronic device is detected, a target electronic device at a distance that is within a preset distance away from the controlled electronic device is determined.

In some embodiments, detection of the starting operation over the controlled electronic device may be understood as detection of an unlocking or wakeup operation over the controlled electronic device. Detection of the starting operation over the controlled electronic device may also be understood as detection of an unlocking or wakeup operation over the controlled electronic device and completion of starting of the controlled electronic device responsive to the unlocking or wakeup operation.

It is to be noted that detection of the starting operation over the controlled electronic device may be understood as detection of a fingerprint unlocking operation, a cover sliding operation, a gesture unlocking operation, an unlocking voice and the like. When the controlled electronic device is in a screen-locked standby status, whether there is the unlocking operation or not is detected.

The preset distance may be pre-stored in the controlled electronic device, or may be acquired by the controlled electronic device from another device, or may be acquired by the controlled electronic device from an input of a user through a human-computer interaction device.

In some embodiments, the operation that the target electronic device at the distance that is within the preset distance away from the controlled electronic device may include that: at least one electronic device at a distance that is within the preset distance away from the controlled electronic device is determined, a friend electronic device is determined from the determined at least one electronic device as the target electronic device, the friend electronic device being an electronic device which is preset in at least one preset APP and has a preset authority; and/or a pre-registered smart device among the determined at least one device is determined as the target electronic device.

In the implementation mode, the friend electronic device may be preset to have a preset authority. The preset authority may include an authority through which the controlled electronic device can acquire a working mode of the friend electronic device. During a practical application, the friend electronic device may be set by multiple APPs (the friend electronic device may be named differently by different APPs but all refers to the device with a preset authority). For example, familiarity numbers may be set in a contact list, friends may be set in a MIUI account, new friends may be set in WeChat, etc. and all these familiarity accounts may be configured with preset authorities. In practice, when the friend electronic device is set by an APP, the preset authority of the friend electronic device may be notified to a server simultaneously. Then, when the controlled electronic device requests the friend electronic device for a working mode of the friend electronic device, the friend electronic device may send its own working mode to the controlled electronic device, or the friend electronic device may send its own working mode to the server according to a preset frequency, and thus the controlled electronic device may acquire a latest working mode of the friend electronic device and the like from the server anytime. Elaborations are not described herein.

Furthermore, when the friend electronic device is set, a unique identifier (for example, a Universally Unique Identifier (UUID) or an International Mobile Equipment Identity (IMEI)) of the friend electronic device may be determined, and after the at least one electronic device at the distance that is within the preset distance away from the controlled electronic device is determined, a unique identifier of the at least one electronic device within the preset distance may be acquired, and whether the friend electronic device exists or not is determined according to the unique identifier, thereby determining the friend electronic device as the target electronic device.

For another example, the operation that the friend electronic device is determined from the determined at least one electronic device as the target electronic device may be understood as that the controlled device sends a query instruction to the at least one electronic device at the distance that is within the preset distance to request an electronic device that receives the query instruction to return authority information in response to the query instruction, the authority information being used to indicate whether the electronic device has the authority preset by the corresponding preset APP or not, thereby determining whether the electronic device is the friend electronic device or not.

In addition, for smart devices, the pre-registered smart device among the determined at least one electronic device may also be determined as the target electronic device. Some smart devices may be set with working modes in which the smart devices do not want to be disturbed during work. For example, a smart lamp may work in a focus mode, a smart sound may work in a playing mode, and a wearable device may work in a sleep mode. The controlled electronic device should not interfere with use of a smart device in a preset working mode either, and the smart device may be pre-registered, for example, registered to the controlled device, registered to another device with uploading registration information to the server, or registered to the server. The pre-registered smart device may be determined as the target electronic device. The working mode of the smart device may be directly acquired from the smart device, or acquired from the server once being reported to the server by the smart device.

In another implementation mode, the operation that the target electronic device at the distance that is within the preset distance away from the controlled electronic device is determined may further include that: the at least one electronic device at the distance that is within the preset distance away from the controlled electronic device is determined, and an electronic device meeting any one of the following conditions can determined from the determined at least one device as the target electronic device. The conditions can include:

1: for an account or a number in a login status in a contact list of a preset APP installed in the controlled electronic device, an electronic device where the preset APP corresponding to the account or the number is installed is the target electronic device;

2: an electronic device of which a frequency of contact or connection with the controlled electronic device meets a preset contact or connection frequency condition is the target electronic device; and 3: a smart device in an on status is the target electronic device.

In the implementation mode, the electronic device meeting any condition of the condition 1, the condition 2 and the condition 3 may be determined as the target electronic device after the at least one electronic device at the distance that is within the preset distance away from the controlled electronic device is determined.

For the condition 1, at least one preset APP (for example, a contact list, MiTalk and WeChat) is installed in the controlled electronic device, each preset APP includes a contact list, and a customer in each contact list may have a friend relationship with a user of the controlled electronic device, so that an account or a number in the login status in each contact list may be determined, and an opposite-side electronic device where an APP corresponding to the account or the number is installed may be determined as a target device. The login status of the account or the number may be directly acquired by sending a message to the corresponding electronic device, or may be acquired from a server of each preset APP (for example, querying at the server of the corresponding APP according to the account or number in the contact list of each preset APP); or the corresponding electronic device may also report its own login status in each preset APP to a preset server according to a preset reporting strategy and acquire the corresponding login status from the preset server. Elaborations are omitted herein.

For the condition 2, an electronic device with a relatively high frequency of contact with the controlled electronic device may also have a friend relationship with the user of the controlled electronic device, so that the electronic device of which the frequency of contact with the controlled electronic device meets the preset contact frequency condition may be determined as the target electronic device. A smart device with a relatively high frequency of connection with the controlled electronic device may be a smart device frequently used by the user or a person around the user, so that the electronic device of which the frequency of connection with the controlled electronic device meets the preset connection frequency condition may be determined as the target electronic device.

For the condition 3, a status of a smart device around may be acquired, and the smart device, if being in an on status, may be determined as a target smart device. For example, whether the smart device is in the on status or not may be directly acquired, or acquired through a server. Elaborations are omitted herein.

It is to be noted that, in the condition 1, when multiple different preset APPs are installed in the electronic device and target electronic devices are determined according to accounts or numbers in the login status in contact lists of different preset APPs installed in the controlled electronic device, the multiple determined target electronic devices may be the same electronic device. Subsequently, duplication elimination may be performed on the determined target electronic devices according to unique identifiers of the target electronic devices. If two different target electronic devices have the same identifier, one of the two is dropped, namely the one is not determined as a target electronic device anymore.

In the operation 102, a working mode of the target electronic device is determined.

In some embodiments, the operation that the working mode of the target electronic device is determined may be implemented by downloading, from a working mode server, working mode report information uploaded by the target electronic device and determining the working mode of the target electronic device according to the working mode report information. The operation that the working mode of the target electronic device is determined may also be implemented by receiving working mode broadcast information from the target electronic device and determining the working mode of the target electronic device according to the working mode broadcast information. The operation that the working mode of the target electronic device is determined may also be implemented by sending working mode request information to the target electronic device to request the target electronic device to return working mode feedback information in response to the working mode request information and determining the working mode of the target electronic device according to the working mode feedback information.

It is to be noted that, when the friend electronic device, or the electronic device where the preset APP corresponding to the account or number in the login state in the contact list in the preset APP installed in the controlled electronic device is installed, or the electronic device of which the frequency of contact with the controlled electronic device meets the preset contact frequency condition or the smart device in the on status is used, the user of such an electronic device may be concerned by the user of the controlled electronic device (even if they may be the same user), and there may be high probability of mutual influence between the use of such an electronic device and the normal use of the controlled electronic device. Accordingly, determining such an electronic device as the target device may avoid excessive influence from normal use of the controlled electronic device on the target electronic device and the user experience is further improved.

In the operation 103, responsive to that the working mode of the target electronic device is matched with a first preset working mode, a working mode of the controlled electronic device is adjusted to a second preset working mode to avoid interference from the controlled electronic device to use of the target electronic device.

In some embodiments, the first preset working mode may include a working mode which is provided by the electronic device and enables an APP or function (for example, an incoming call APP, a prompting function and a notification function) that produces sound when triggered to be silent or adjusted to a status (for example, a vibration status) without disturbance to the user when the electronic device is locked, for example, a silent mode, a vibration mode, a do-not-disturb mode, a sleep mode, a driving mode and a focus mode (for example, the smart lamp) in the electronic device.

The first preset working mode may further include a working mode of running the preset APP. The sensitivity of the preset APP in running to an ambient noise environment reaches a preset degree. For example, different APPs require a noise value to be lower than corresponding preset decibel values, for example, a sound recording APP, a voice communication APP, a video playing APP, an audio playing APP and a calling APP.

The working mode of the controlled electronic device is adjusted to the second preset working mode, and the second preset working mode may be used to include that the working mode of the controlled electronic device is adjusted to a working mode which is provided by the electronic device to enables an APP or function (for example, the incoming call APP, the prompting function and the notification function) that produces sound when being triggered to be silent or adjusted to a status (for example, a vibration status) without disturbance to the user when the electronic device is locked, for example, a silent mode, a vibration mode, a do-not-disturb mode, a sleep mode, a driving mode and a focus mode in the electronic device.

The second working mode may further include a working mode in which a volume of the controlled electronic device is set to be less than or equal to a preset volume threshold.

The operation that the volume of the controlled electronic device is set to be less than or equal to the preset volume threshold may be implemented by setting a volume of sound produced by a speaker and a receiver of the controlled electronic device to be less than or equal to the preset volume threshold, or may also be implemented by controlling a frequency and amplitude of vibration generated by a vibration portion of the controlled electronic device to make a volume produced by vibration of the vibration portion less than or equal to the preset volume threshold.

In the technical solution provided in the embodiment of the present disclosure, the target electronic device at the distance that is within the preset distance away from the controlled electronic device is determined responsive to that the starting operation over the controlled electronic device is detected, the working mode of the target electronic device is determined, and responsive to that the working mode of the target electronic device is matched with the first preset working mode, namely a working status of the target electronic device in the first preset working mode may be influenced by the controlled electronic device not in the second preset working mode, the working mode of the controlled electronic device is adjusted to the second preset working mode to avoid interference from the controlled electronic device on use of the target electronic device. Therefore, according to the solution, the working mode of the controlled electronic device can be controlled when the controlled electronic device may influence use of the target electronic device, thereby reducing influence from the controlled electronic device on use of the target electronic device as much as possible and further improving the user experience.

Figure 1B:
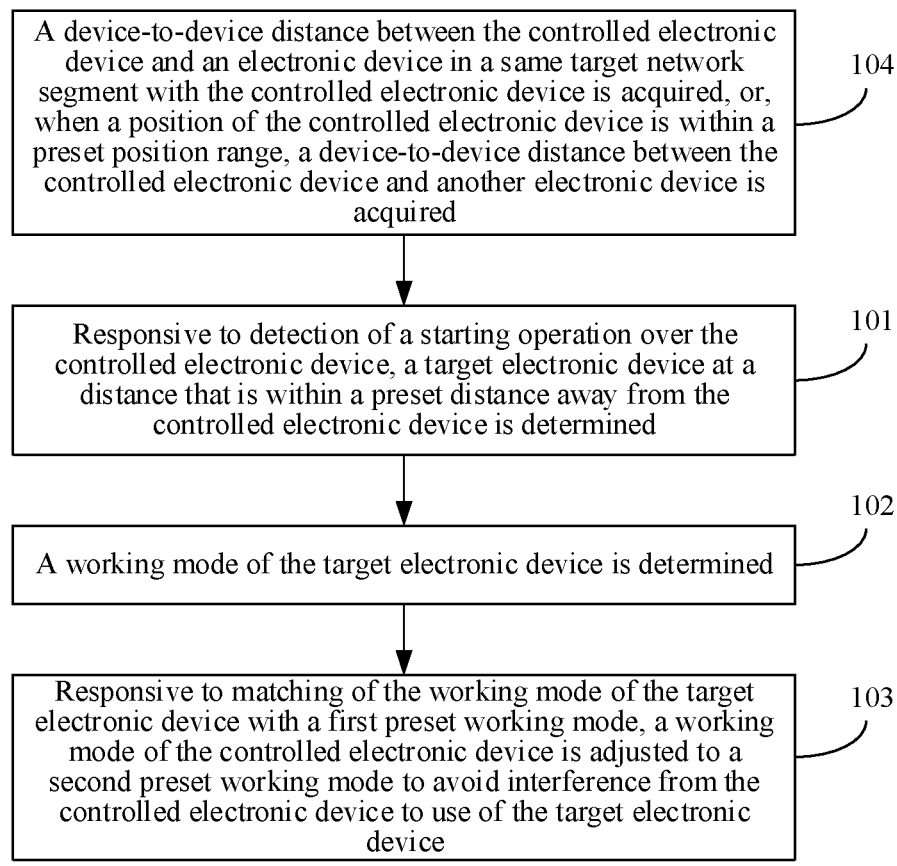
FIG. 1B is a flowchart illustrating a method for controlling an electronic device according to some embodiments of the present disclosure.

In some embodiments, as shown in FIG. 1B, the method further includes operation 104.

In the operation 104, a device-to-device distance between the controlled electronic device and an electronic device in the same target network segment with the controlled electronic device and is acquired, or, when a position of the controlled electronic device is within a preset position range, a device-to-device distance between the controlled electronic device and another electronic device is acquired.

In some embodiments, the operation that the distance between the controlled electronic device and the another electronic device is acquired may be implemented by controlling the controlled electronic device to acquire electronic signal strength (for example, Bluetooth (BT) signal strength and Wireless Fidelity (Wi-Fi) signal strength) of the another electronic device and acquire the distance between the controlled electronic device and the another electronic device according to the electronic signal strength, the electronic signal strength being inversely proportional to the distance.

The position being within the preset position range may be understood as that a distance away from a specified position is within a preset distance range. The specified position may be a present position of the controlled electronic device, and the preset distance range may be less than or equal to 100 meters. For another example, the specified position may be specified in advance, for example, a coordinate of the specified position may be N40° 01'44.38" (north latitude) and E116° 19'42.05" (east longitude), and the preset distance range may be less than or equal to 50 meters.

The operation that the distance between the controlled electronic device and the another electronic device is acquired may also be implemented as follows: position report information sent by the another electronic device is received, a position of the another electronic device is acquired according to the position report information, the position report information being used to indicate the position of the electronic device which sends the position report information, and the controlled electronic device acquires its own position through a positioning portion such as a Global Positioning System (GPS) and acquires the distance between the controlled electronic device and the another electronic device according to its own position and the position of the another electronic device.

It is to be noted that the operation that the position report information sent by the another electronic device is received may be implemented by sending an instruction for requesting the position report information to the another electronic device to request the another electronic device to return the position report information responsive to the instruction for requesting the position report information, or may be implemented by acquiring the position report information reported by the another electronic device from a preset server.

Since the electronic device in the same target network segment with the controlled electronic device may be located in the same place or the same application scenario with the controlled electronic device under a normal circumstance, the probability that the controlled electronic device influences use of the electronic device in the same target network segment is relatively high; and when the position of the controlled electronic device is within the preset position range, the probability that the controlled electronic device influences an electronic device around is also relatively high. Acquiring the device-to-device distance between the controlled electronic device and the electronic device in the same target network segment with the controlled electronic device or acquiring the device-to-device distance between the controlled electronic device and the another electronic device when the position of the controlled electronic device is within the preset position range may reduce the number of times for which the distance is required to be acquired, thereby reducing power consumption and improving the user experience.

In some embodiments, descriptions will be made below by taking the condition that the controlled electronic device is a mobile phone of a user and a target mobile phone is another mobile phone as an example.

When the mobile phone of the user detects an unlocking or wakeup operation or the mobile phone of the user detects such an operation and is unlocked or woken up responsive to the operation, working mode broadcast information may be broadcast through a Wi-Fi network that the mobile phone of the user accesses. The working mode broadcast information is used to instruct other mobile phones in the same network segment with the mobile phone of the user to perform distance detection together with the mobile phone of the user, and other mobile phones at a distance that is within a preset distance away from the mobile phone of the user is determined according to a distance monitor result.

For example, the mobile phone of the user and the other mobile phones in the same network segment with the mobile phone of the user may acquire their own position information through GPS, and the position information is sent to the mobile phone of the user to enable the mobile phone of the user to acquire distances between it and the other mobile phones according to the position information of the other mobile phones and its own position information and determine, from the other mobile phones according to the acquired distances, mobile phones at a distance that is within the preset distance away from it.

The mobile phone of the user may send friend determination indication information (the information may contain the number or identifier of the mobile phone of the user) to the another mobile phone at the distance that is within the preset distance away from it through a Wi-Fi network and determine a friend mobile phone according to friend determination information returned by the another mobile phone. The friend determination indication information is used to instruct the another mobile phone within the preset distance to query a corresponding APP, so as to determine whether the another mobile phone is a friend of the mobile phone according to a query result and, if the another mobile phone is a friend, the another mobile phone may return the friend determination information through the Wi-Fi network.

For example, the another mobile phone which receives the friend determination indication information may query its own contact list, and if the number of the mobile phone of the user is set as a familiarity number in the contact list of the another mobile phone, then the another mobile phone is determined as the friend of the mobile phone of the user. For another example, the another mobile phone which receives the friend determination indication information may query its own communication record, and if a frequency of communication of the another mobile phone with the number of the mobile phone of the user is higher than a preset communication frequency (which may be preset, for example, once a day), the another mobile phone is determined as the friend of the mobile phone of the user.

The mobile phone of the user may also send a mobile phone identifier request instruction to the another mobile phone at the distance that is within the preset distance away from the mobile phone through a Wi-Fi network to request the another mobile phone which receives the instruction to return its own number or identifier. The mobile phone of the user may query its APP(s) according to the returned number or identifier to determine whether the another mobile phone is its friend or not according to a query result.

For example, the mobile phone of the user may query its own contact list according to the returned number, and if the returned number is set as a familiarity number in its own contact list, the another mobile phone corresponding to the number is determined as the friend of the mobile phone of the user. For another example, the mobile phone of the user may query its own communication record according to the returned number, and if a frequency of communication with the returned number is higher than a preset communication frequency (which may be preset, for example, once a day), the another mobile phone corresponding to the returned number is determined as the friend of the mobile phone of the user.

The mobile phone of the user may determine the friend mobile phone as the target mobile phone. The mobile phone of the user may send a working mode request instruction to the target mobile phone through a Wi-Fi network to request the target mobile phone to return working mode information of the target mobile phone responsive to the working mode request instruction to the mobile phone of the user through the Wi-Fi network. The working mode information of the target mobile phone may be used to indicate a working mode of the target mobile phone. The mobile phone of the user may determine the working mode of the target mobile phone according to the working mode information of the target mobile phone and match the working mode of the target mobile phone with a first preset working mode. When determining that the working mode of the target mobile phone is matched with the first preset working mode, the mobile phone of the user may adjust its own working mode to a second preset working mode to avoid interference from the controlled electronic device on the use of the target mobile phone.

The working mode may be configured to indicate whether the mobile phone works in a status in which it is easily influenced by various signals (for example, a sound signal generated by a speaker, a light signal generated by a flashlight and a display screen, an electromagnetic signal generated by an antenna, and a vibration signal generated by a vibration portion). The first preset working mode may be understood as a working mode in which the mobile phone is relatively easily influenced by an external signal. The second preset working mode may be used to be understood as a working mode in which the mobile phone of the user does not have great interference or influence on the target mobile phone.

For example, information about the first preset working mode may be used to indicate that a recording APP in the mobile phone is in an activated status, and in such a case, the mobile phone is easily interfered by a sound signal and a vibration signal generated by the another mobile phone. Accordingly, information about the second preset working mode may be used to instruct a volume of a sound signal generated by the mobile phone of the user to be adjusted to be less than or equal to a preset volume, instruct an amplitude of a vibration signal generated by the mobile phone of the user to be adjusted to be less than or equal to a preset vibration amplitude and instruct a frequency of the vibration signal generated by the mobile phone of the user to be within a specified vibration frequency range, and may also be used to instruct the mobile phone of the user to be adjusted to a working mode in which an APP or function that produces sound when triggered is muted, for example, a silent mode, a vibration mode, a do-not-disturb mode, a sleep mode, a driving mode and a focus mode, to avoid interference from a sound signal or vibration signal generated by the mobile phone of the user to use of the target mobile phone.

For another example, the information about the first preset working mode may indicate that a shooting APP in the mobile phone is in an activated status, and in such a case, the mobile phone is easily interfered by a light signal generated by the another mobile phone. Accordingly, the information about the second preset working mode may be used to instruct an intensity of a light signal generated by the mobile phone of the user to be adjusted to be less than or equal to a preset light intensity to avoid interference from the light signal generated by the mobile phone of the user to use of the target mobile phone.

For another example, when the first preset working mode may be any one of a silent mode, a vibration mode, a do-not-disturb mode, a sleep mode and a driving mode of the mobile phone, the use of the mobile phone is easily interfered by a sound signal, a vibration signal and a light signal generated by other mobile phones. Therefore, the information about the second preset working mode may be used to instruct a volume of a sound signal generated by the mobile phone of the user to be adjusted to be less than or equal to a preset volume, instruct an amplitude of a vibration signal generated by the mobile phone of the user to be adjusted to be less than or equal to a preset vibration amplitude, instruct a frequency of a vibration signal generated by the mobile phone of the user to be within a specified vibration frequency range and instruct an intensity of a light signal generated by the mobile phone of the user to be adjusted to be less than or equal to a preset light intensity, and may also be used to instruct the mobile phone of the user to be adjusted to a working mode in which an APP or function that produces sound when triggered is muted, for example, a silent mode, a vibration mode, a do-not-disturb mode, a sleep mode, a driving mode and a focus mode, to avoid interference from the sound signal, vibration signal or light signal generated by the mobile phone of the user to use of the target mobile phone.

In some embodiments, descriptions will be made below by taking the condition that the controlled electronic device is a mobile phone of a user and the target electronic device is a smart device (for example, a smart lamp and a smart sound) as an example.

When the mobile phone of the user detects an unlocking or wakeup operation from the user of the mobile phone or the mobile phone of the user detects such an operation and is unlocked or woken up accordingly, strength of Blue Teeth (BT) signals sent by other smart devices may be detected through a BT portion of the mobile phone of the user, and since strength of a BT signal may become extremely weak at a long distance away from the smart devices and the strength of the BT signal is inversely proportional to the distance, a smart device corresponding to a BT signal with signal strength stronger than or equal to preset BT signal strength may be determined as a smart device at a distance that is within a preset distance away from the mobile phone of the user.

The mobile phone of the user may be connected with the smart device at the distance that is within the preset distance through a BT device and request for a device identifier of the smart device. The device identifier of the smart device may be pre-registered in an APP (for example, a Miui smart home APP) in the mobile phone of the user, or may be assigned by a manufacturer during delivery of the smart device, for example, the device identifier may be a product number. The mobile phone of the user may query the APP (for example, the Miui smart home APP) according to the device identifier of the smart device and determine whether the smart device with the device identifier is a pre-registered smart device or not according to a query result.

For example, the mobile phone of the user may query the Miui smart home APP according to the device identifier of the smart device and, if the smart device with the device identifier has been registered in the Miui smart home APP, determine the smart device with the device identifier as the target electronic device. For another example, the mobile phone of the user may query a BT connection record according to the device identifier of the smart device and, if a frequency of connection of the mobile phone of the user with the smart device as indicated in the BT connection record is higher than a preset connection frequency (which may be preset, for example, twice a day), determine the smart device with the device identifier as the target electronic device.

The mobile phone of the user may send a working mode request instruction to the target smart electronic device through a BT connection to request the target smart electronic device to return working mode information of the target smart electronic device to the mobile phone of the user through the BT connection. The working mode information of the target smart electronic device may be used to indicate a working mode of the target smart electronic device. The mobile phone of the user may determine the working mode of the target smart electronic device according to the working mode information of the target smart electronic device and match the working mode of the target smart electronic device with a first preset working mode. When the mobile phone of the user determines that the working mode of the target smart electronic device is matched with the first preset working mode, the working mode of the mobile phone may be adjusted to a second preset working mode to avoid interference from the controlled electronic device to use of the target smart electronic device.

The working mode may be configured to indicate whether the smart device works in a status in which it is easily influenced by various external signals (for example, a sound signal generated by a speaker, a light signal generated by a flashlight and a display screen, an electromagnetic signal generated by an antenna, and a vibration signal generated by a vibration portion). The first preset working mode may be understood as a working mode in which the smart device is relatively easily influenced by an external signal. The second preset working mode may be used to be understood as a working mode in which the mobile phone of the user does not have great interference or influence on the smart device.

For example, the smart device may be a smart sound. Information about the first preset working mode may indicate that the smart sound is in a working status, and in such a case, the smart sound may be easily interfered by a sound signal generated by another mobile phone (for example, a voice signal generated by the mobile phone may easily be recognized by the smart sound as a voice instruction sent by the user, thereby causing mistaken recognition). Therefore, information about the second preset working mode may be used to instruct a volume of a sound signal generated by the mobile phone of the user to be adjusted to be less than or equal to a preset volume, and may also be used to instruct the mobile phone of the user to be adjusted to a working mode in which an APP or function that produces sound when triggered is muted, for example, a silent mode, a vibration mode, a do-not-disturb mode, a sleep mode, a driving mode and a focus mode, to avoid interference from the sound signal or vibration signal generated by the mobile phone of the user to use of the target smart sound.

For another example, the smart device may be a smart lamp; the information about the first preset working mode may indicate that the smart lamp is in a focus mode, and in such a case, the smart lamp may be easily interfered by a light signal generated by another mobile phone (for example, when the smart lamp is in the focus mode, a user of the smart lamp is very likely to be reading or writing, and in such a case, sound produced by the mobile phone may easily interfere with the user which is using the smart lamp, namely interfering with the use of the smart lamp). Therefore, the information about the second preset working mode may be used to instruct a volume of the mobile phone of the user to be adjusted to be a preset volume to avoid interference from the sound signal generated by the mobile phone of the user on use of the target smart device.

An implementation process will be introduced below through an embodiment in detail.

Figure 2:
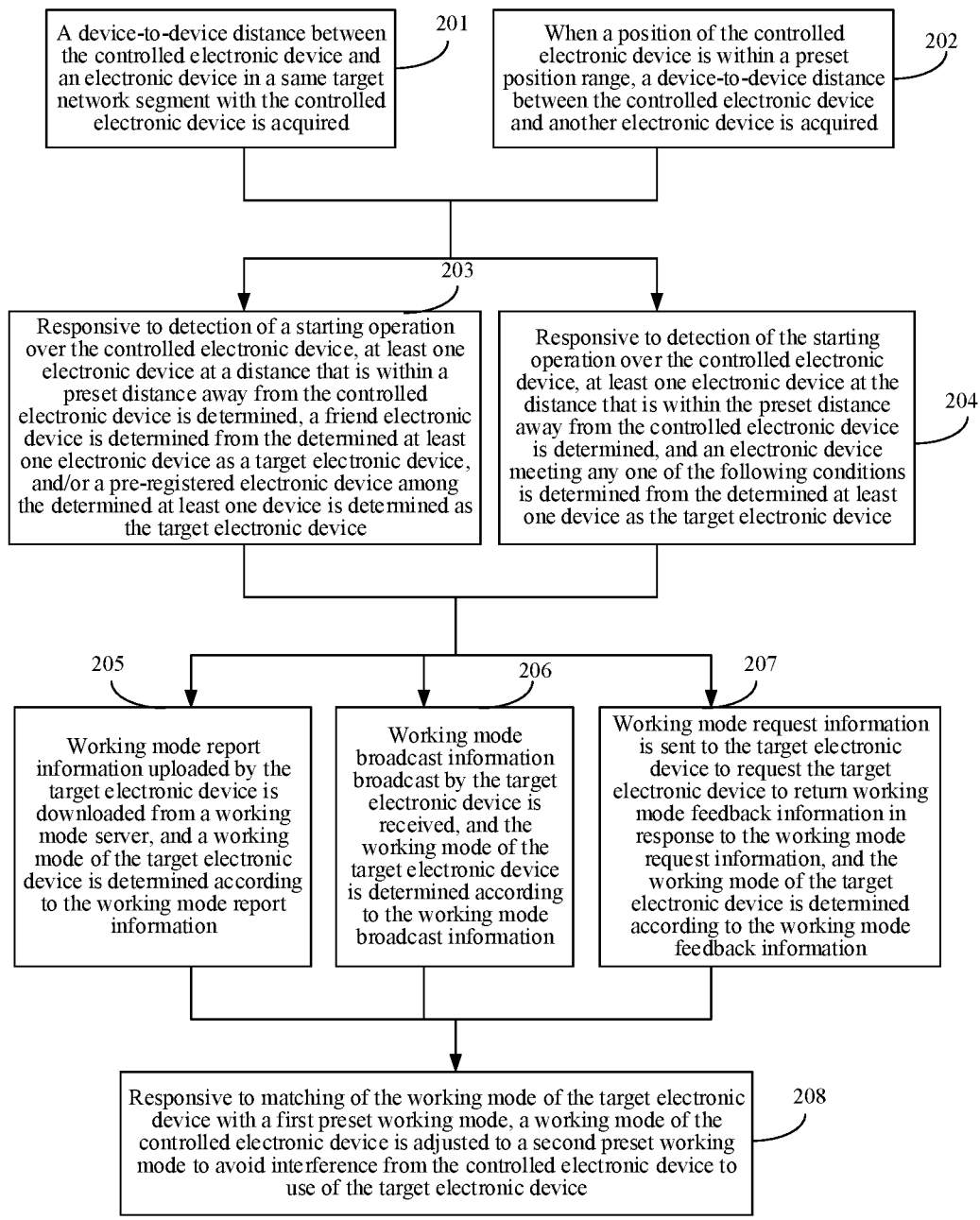
FIG. 2 is an interaction flowchart illustrating a method for controlling an electronic device according to some embodiments of the present disclosure.

FIG. 2 is a schematic flowchart illustrating a method for controlling an electronic device according to some embodiments. As shown in FIG. 2, the method can include following operations.

In operation 201, a device-to-device distance between the controlled electronic device and an electronic device in a same target network segment with the controlled electronic device is acquired.

In operation 202, when a position of the controlled electronic device is within a preset position range, a device-to-device distance between the controlled electronic device and another electronic device is acquired.

It is to be noted that subsequent operations can be executed when any one of operation 201 and operation 202 is executed.

In operation 203, responsive to detection of a starting operation over the controlled electronic device, at least one electronic device at a distance that is within a preset distance away from the controlled electronic device is determined, a friend electronic device is determined from the determined at least one electronic device as a target electronic device, and/or a pre-registered electronic device among the determined at least one device is determined as a target electronic device.

The friend electronic device is an electronic device which is preset in at least one preset APP and has a preset authority.

In operation 204, responsive to that the starting operation over the controlled electronic device is detected, the at least one electronic device at the distance that is within the preset distance away from the controlled electronic device is determined, and an electronic device meeting any one of the following conditions is determined from the determined at least one device as the target electronic device:

for an account or a number in a login status in a contact list in a preset APP installed in the controlled electronic device, an electronic device where the preset APP corresponding to the account or the number is installed, an electronic device of which a frequency of contact or connection with the controlled electronic device meets a preset contact or connection frequency condition, and a smart device in an on status.

It is to be noted that subsequent operations can be executed when any one of the operation 203 or the operation 204 is executed after execution of the operation 201 or the operation 202.

In operation 205, working mode report information uploaded by the target electronic device is downloaded from a working mode server, and a working mode of the target electronic device is determined according to the working mode report information.

In operation 206, working mode broadcast information broadcast by the target electronic device is received, and the working mode of the target electronic device is determined according to the working mode broadcast information.

In operation 207, working mode request information is sent to the target electronic device to request the target electronic device to return working mode feedback information in response to the working mode request information, and the working mode of the target electronic device is determined according to the working mode feedback information.

It is to be noted that operation 208 can be executed when any one of the operation 205 through the operation 207 is executed after execution of the operation 203 or the operation 204.

In the operation 208, responsive to that the working mode of the target electronic device is matched with a first preset working mode, a working mode of the controlled electronic device is adjusted to a second preset working mode to avoid interference from the controlled electronic device to use of the target electronic device.

In the technical solution provided in the embodiments of the present disclosure, the target electronic device at the distance that is within the preset distance away from the controlled electronic device is determined responsive to that the starting operation over the controlled electronic device is detected, the working mode of the target electronic device is determined, and responsive to that the working mode of the target electronic device is matched with the first preset working mode, namely a working status of the target electronic device in the first preset working mode may be influenced by the controlled electronic device which is not in the second preset working mode, the working mode of the controlled electronic device is adjusted to the second preset working mode to avoid interference from the controlled electronic device to use of the target electronic device. Therefore, according to the solution, the working mode of the controlled electronic device can be controlled when the controlled electronic device may influence use of the target electronic device, thereby reducing influence from the controlled electronic device to use of the target electronic device as much as possible and further improving the user experience.

A device embodiment of the present disclosure is provided below, which may execute the method embodiments of the present disclosure.

Figure 3A:
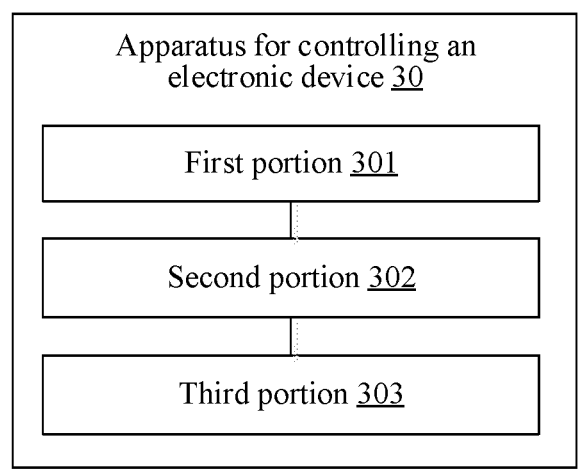
FIG. 3A is a structure diagram of an apparatus for controlling an electronic device according to some embodiments of the present disclosure.

FIG. 3A is a block diagram of an apparatus 30 for controlling an electronic device according to some embodiments of the present disclosure. The apparatus 30 for controlling an electronic device may be a terminal or a part of a terminal. The apparatus 30 for controlling an electronic device may be implemented into part or all of the electronic device through software, hardware or a combination of the two. As shown in FIG. 3A, the apparatus 30 for controlling an electronic device includes the following portions.

A first portion 301 is configured to, responsive to that a starting operation over a controlled electronic device is detected, determine a target electronic device at a distance that is within a preset distance away from the controlled electronic device;

A second portion 302 is configured to determine a working mode of the target electronic device.

A third portion 303 is configured to, responsive to that the working mode of the target electronic device is matched with a first preset working mode, adjust a working mode of the controlled electronic device to a second preset working mode to avoid interference from the controlled electronic device to use of the target electronic device.

Figure 3B:
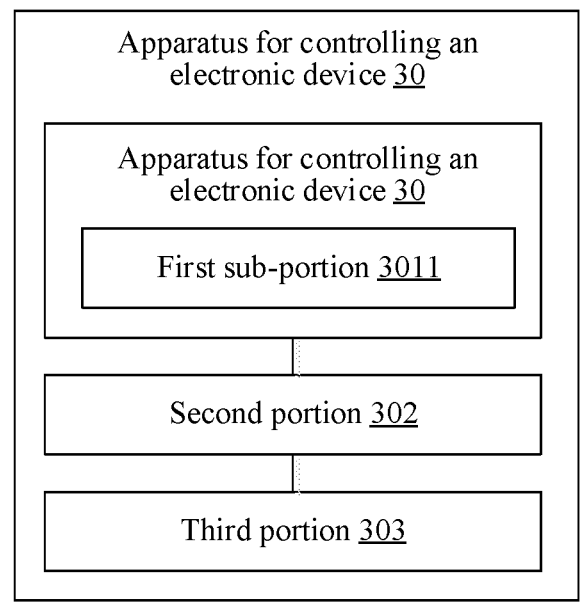
FIG. 3B is a structure diagram of an apparatus for controlling an electronic device according to some embodiments of the present disclosure.

In some embodiments, as shown in FIG. 3B, the first portion 301 may include:

a first sub-portion 3011, configured to determine at least one electronic device at a distance that is within the preset distance away from the controlled electronic device, determine a familiarity electronic device from the determined at least one electronic device as the target electronic device and/or determine a pre-registered smart device among the determined at least one electronic device as the target electronic device, the familiarity electronic device being an electronic device which is preset in at least one preset APP and has a preset authority.

Figure 3C:
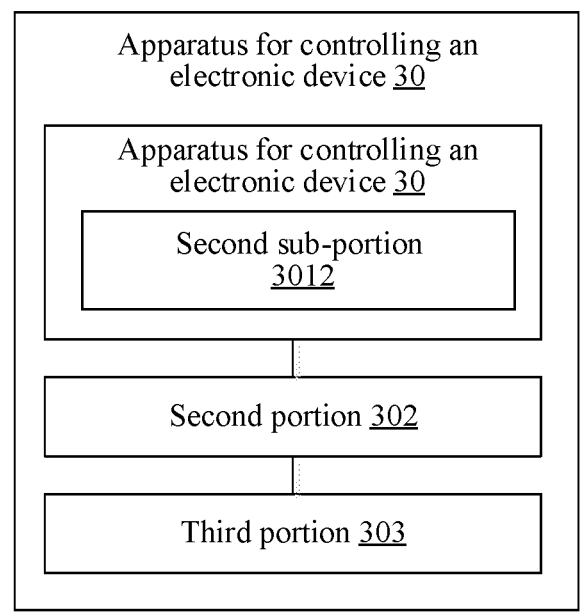
FIG. 3C is a structure diagram of an apparatus for controlling an electronic device according to some embodiments of the present disclosure.

In some embodiments, as shown in FIG. 3C, the first portion 301 may include:

a second sub-portion 3012, configured to determine the at least one electronic device at the distance that is within the preset distance away from the controlled electronic device and determine, from the determined at least one electronic device, an electronic device meeting any one of the following conditions as the target electronic device:

for an account or a number in a login status in a contact list in a preset APP installed in the controlled electronic device, an electronic device where the preset APP corresponding to the account or the number is installed, an electronic device of which a frequency of contact or connection with the controlled electronic device meets a preset contact or connection frequency condition, and a smart device in an on status.

Figure 3D:
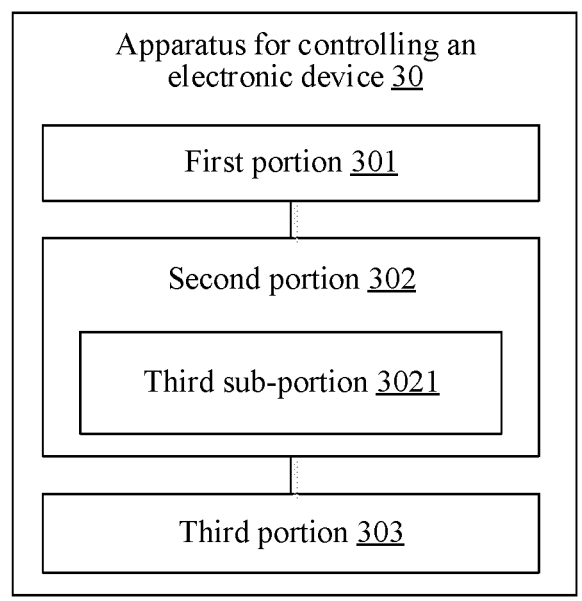
FIG. 3D is a structure diagram of an apparatus for controlling an electronic device according to some embodiments of the present disclosure.

In some embodiments, as shown in FIG. 3D, the second portion 302 may include:

a third sub-portion 3021, configured to download, from a working mode server, working mode report information uploaded by the target electronic device and determine the working mode of the target electronic device according to the working mode report information, or, configured to receive working mode broadcast information broadcast by the target electronic device and determine the working mode of the target electronic device according to the working mode broadcast information, or, configured to send working mode request information to the target electronic device to request the target electronic device to return working mode feedback information in response to the working mode request information and determine the working mode of the target electronic device according to the working mode feedback information.

Figure 3E:
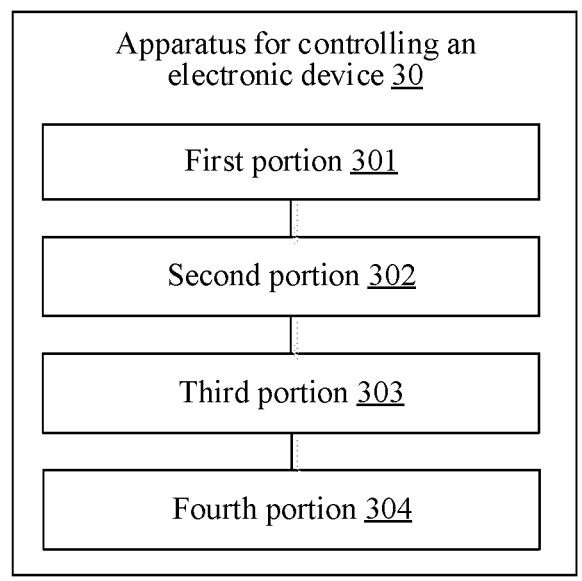
FIG. 3E is a structure diagram of an apparatus for controlling an electronic device according to some embodiments of the present disclosure.

In some embodiments, as shown in FIG. 3E, the apparatus 30 for controlling an electronic device may further include:

a fourth portion 304, configured to acquire a device-to-device distance between the controlled electronic device and an electronic device in a same target network segment with the controlled electronic device, or, configured to, when a position of the controlled electronic device is within a preset position range, acquire a device-to-device distance between the controlled electronic device and another electronic device.

In some embodiments, detection of the starting operation over the controlled electronic device may include:

detecting an unlocking or wakeup operation over the controlled electronic device;

or, detecting an unlocking or wakeup operation over the controlled electronic device and completing starting of the controlled electronic device responsive to the unlocking or wakeup operation.

In some embodiments, the first preset working mode may include being in an audio file playing status, being in a video file playing status, being in a call status and being in a target APP running status.

As provided in the embodiments of the present disclosure, the apparatus for controlling an electronic device may determine the target electronic device at the distance that is within the preset distance away from the controlled electronic device responsive to that the starting operation over the controlled electronic device is detected, determine the working mode of the target electronic device and, responsive to that the working mode of the target electronic device is matched with the first preset working mode, namely a working status of the target electronic device in the first preset working mode may be influenced by the controlled electronic device that is not in the second preset working mode, adjust the working mode of the controlled electronic device to the second preset working mode to avoid interference from the controlled electronic device to use of the target electronic device. Accordingly, the working mode of the controlled electronic device can be controlled when the controlled electronic device may influence use of the target electronic device, thereby reducing influence from the controlled electronic device to use of the target electronic device as much as possible and further improving user experience.

Figure 4:
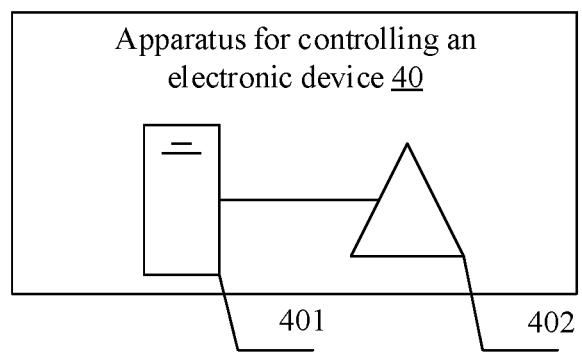
FIG. 4 is a block diagram of an apparatus according to some embodiments of the present disclosure.

FIG. 4 is a block diagram of an apparatus 40 for controlling an electronic device according to some embodiments. The apparatus 40 for controlling an electronic device may be a terminal or a part of a terminal. The apparatus 40 for controlling an electronic device includes:

a processor 401; and a memory 402 configured to store an instruction executable by the processor 401, wherein the processor 401 is configured to:

responsive to that a starting operation over a controlled electronic device is detected, determine a target electronic device at a distance that is within a preset distance away from the controlled electronic device;

determine a working mode of the target electronic device; and responsive to that the working mode of the target electronic device is matched with a first preset working mode, adjust a working mode of the controlled electronic device to a second preset working mode to avoid interference from the controlled electronic device to use of the target electronic device.

In some embodiments, for the operation of determining the target electronic device at the distance that is within the preset distance away from the controlled electronic device, the processor 401 may further be configured to execute following operations of:

determining at least one electronic device at a distance that is within the preset distance away from the controlled electronic device; and determining, from the determined at least one electronic device, a friend electronic device as the target electronic device, and/or determining a pre-registered smart device among the determined at least one device as the target electronic device, the friend electronic device being an electronic device which is preset in at least one preset APP and has a preset authority.

In some embodiments, for the operation of determining the target electronic device at the distance that is within the preset distance away from the controlled electronic device, the processor 401 may further be configured to execute following operations of:

determining at least one electronic device at a distance that is within the preset distance away from the controlled electronic device; and determining, from the determined at least one device, an electronic device meeting any one of the following conditions as the target electronic device:

for an account or a number in a login status in a contact list in a preset APP installed in the controlled electronic device, an electronic device where the preset APP corresponding to the account or the number is installed, an electronic device of which a frequency of contact or connection with the controlled electronic device meets a preset contact or connection frequency condition, and a smart device in an on status.

In some embodiments, for the operation of determining the working mode of the target electronic device, the processor 401 may further be configured to execute following operations of:

downloading, from a working mode server, working mode report information uploaded by the target electronic device, and determining the working mode of the target electronic device according to the working mode report information; or, controlling a transceiver to receive working mode broadcast information that is broadcast by the target electronic device, and determining the working mode of the target electronic device according to the working mode broadcast information; or, controlling a transceiver to send working mode request information to the target electronic device to request the target electronic device to return working mode feedback information, and determining the working mode of the target electronic device according to the working mode feedback information.

In some embodiments, the processor 401 may further be configured to execute following operations of:

acquiring a device-to-device distance between the controlled electronic device and an electronic device in a same target network segment with the controlled electronic device;

or, acquiring a device-to-device distance between the controlled electronic device and another electronic device is acquired when a position of the controlled electronic device is within a preset position range.

In some embodiments, for the operation of detecting the starting operation over the controlled electronic device, the processor 401 may further be configured to execute following operations of:

detecting an unlocking or wakeup operation over the controlled electronic device;

or, detecting an unlocking or wakeup operation over the controlled electronic device and completing starting of the controlled electronic device responsive to the unlocking or wakeup operation.

The first preset working mode may include: being in an audio file playing status, being in a video file playing status, being in a call status and being in a target APP running status.

As provided in the embodiments of the present disclosure, the apparatus for controlling an electronic device may determine the target electronic device at the distance that is within the preset distance away from the controlled electronic device responsive to that the starting operation over the controlled electronic device is detected, determine the working mode of the target electronic device and, responsive to that the working mode of the target electronic device is matched with the first preset working mode, namely a working status of the target electronic device in the first preset working mode may be influenced by the controlled electronic device that is not in the second preset working mode, adjust the working mode of the controlled electronic device to the second preset working mode to avoid interference from the controlled electronic device to use of the target electronic device. Accordingly, the working mode of the controlled electronic device can be controlled when the controlled electronic device may influence use of the target electronic device, thereby reducing influence from the controlled electronic device to use of the target electronic device as much as possible and further improving user experience.

Figure 5:
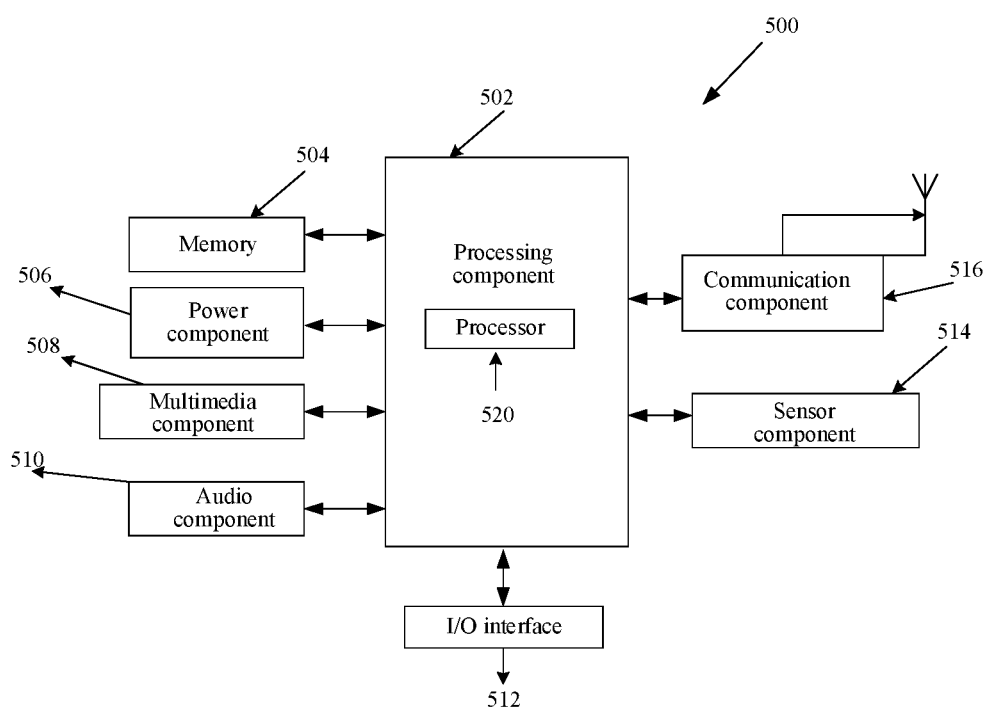
FIG. 5 is a block diagram of an apparatus according to some embodiments of the present disclosure.

FIG. 5 is block diagram of an apparatus 500 for controlling an electronic device according to some embodiments. The apparatus 500 may be applied to a terminal. For example, the apparatus 500 may be a mobile phone, a computer, a digital broadcast terminal, a messaging device, a gaming console, a tablet, a medical device, exercise equipment, a personal digital assistant and the like.

The apparatus 500 may include one or more of the following components: a processing component 502, a memory 504, a power component 506, a multimedia component 508, an audio component 510, an Input/Output (I/O) interface 512, a sensor component 514, and a communication component 516.

The processing component 502 typically is configured to control overall operations of the apparatus 500, such as the operations associated with display, telephone calls, data communications, camera operations, and recording operations. The processing component 502 may include one or more processors 520 to execute instructions to perform all or part of the operations in the abovementioned method. Moreover, the processing component 502 may include one or more portions which facilitate interaction between the processing component 502 and other components. For instance, the processing component 502 may include a multimedia portion to facilitate interaction between the multimedia component 508 and the processing component 502.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

The memory 504 is configured to store various types of data to support the operation of the apparatus 500. Examples of such data may include instructions for any APPs or methods operated on the apparatus 500, contact data, phonebook data, messages, pictures, video, etc. The memory 504 may be implemented by any type of volatile or non-volatile memory devices, or any combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 506 may provide power for various components of the apparatus 500. The power component 506 may include a power management system, one or more power supplies, and other components associated with generation, management and distribution of power for the apparatus 500.

The multimedia component 508 may include a screen for providing an output interface between the apparatus 500 and a user. In some examples, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 508 includes a front camera and/or a rear camera. The front camera and/or the rear camera may receive external multimedia data when the apparatus 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a Microphone (MIC), and the MIC is configured to receive an external audio signal when the apparatus 500 is in the operation mode, such as a call mode, a recording mode and a voice recognition mode. The received audio signal may further be stored in the memory 504 or sent through the communication component 516. In some examples, the audio component 510 further includes a speaker configured to output the audio signal.

The I/O interface 512 may provide an interface between the processing component 502 and a peripheral interface portion, and the peripheral interface portion may be a keyboard, a click wheel, a button and the like. The button may include, but not limited to: a home button, a volume button, a starting button and a locking button.

The sensor component 514 may include one or more sensors configured to provide the apparatus 500 with status assessment in various aspects. For instance, the sensor component 514 may detect an on/off status of the apparatus 500 and relative positioning of components, such as a display and small keyboard of the apparatus 500, and the sensor component 514 may further detect a change in a position of the apparatus 500 or a component of the apparatus 500, presence or absence of contact between the user and the apparatus 500, orientation or acceleration/deceleration of the apparatus 500 and a change in temperature of the apparatus 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging APP. In some examples, the sensor component

514 may also include an acceleration sensor, a gyroscope sensor, a magnetic sensor, a pressure sensor or a temperature sensor.

The communication component 516 is configured to facilitate wired or wireless communication between the apparatus 500 and other equipment. The apparatus 500 may access a communication-standard-based wireless network, such as an intercom private network, a Wireless Fidelity (Wi-Fi) network, a 2nd-Generation (2G), 3rd-Generation (3G), $4^{th}$-Generation (4G), or $5^{th}$-Generation (5G) network or a combination thereof. In some embodiments of the present disclosure, the communication component 516 is configured to receive a broadcast signal or broadcast associated information from an external broadcast management system through a broadcast channel. In some embodiments of the present disclosure, the communication component 516 may further include a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a BT technology and another technology.

In some embodiments of the present disclosure, the apparatus 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments of the present disclosure, there is also provided a non-transitory computer-readable storage medium having stored an instruction thereon, such as the memory 504 having stored an instruction, and the instruction may be executed by the processor 520 of the apparatus 500 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

A non-transitory computer-readable storage medium can have instructions stored thereon, which is executable by a processor of a terminal to enable the terminal to execute the methods of the embodiments described above.

In some embodiments, a non-transitory computer-readable storage medium can have instructions stored thereon, which is executable by a processor of the apparatus 500 to enable the apparatus 500 to implement the method for controlling an electronic device, the method including that:

responsive to that a starting operation over a controlled electronic device is detected, a target electronic device at a distance that is within a preset distance away from the controlled electronic device is determined;

a working mode of the target electronic device is determined; and responsive to that the working mode of the target electronic device is matched with a first preset working mode, a working mode of the controlled electronic device is adjusted to a second preset working mode to avoid interference from the controlled electronic device to use of the target electronic device.

In some embodiments, the operation that the target electronic device at the distance that is within the preset distance away from the controlled electronic device is determined may include that:

at least one electronic device at a distance that is within the preset distance away from the controlled electronic device is determined; and a friend electronic device is determined from the determined at least one electronic device as the target electronic device, the friend electronic device being an electronic device which is preset in at least one preset APP and has a preset authority.

In some embodiments, the operation that the target electronic device at the distance that is within the preset distance away from the controlled electronic device is determined may include that:

the at least one electronic device at the distance that is within the preset distance away from the controlled electronic device is determined; and an electronic device meeting any one of the following conditions is determined from the determined at least one device as the target electronic device:

for an account or number in a login status in a contact list in a preset APP installed in the controlled electronic device, an electronic device where the preset APP corresponding to the account or the number is installed, an electronic device of which a frequency of contact with the controlled electronic device meets a preset contact frequency condition, and a smart device in an on status.

In some embodiments, the operation that the working mode of the target electronic device is determined may include that:

working mode report information uploaded by the target electronic device is downloaded from a working mode server, and the working mode of the target electronic device is determined according to the working mode report information; or, working mode broadcast information broadcast by the target electronic device is received, and the working mode of the target electronic device is determined according to the working mode broadcast information; or, working mode request information is sent to the target electronic device to request the target electronic device to return working mode feedback information in response to the working mode request information, and the working mode of the target electronic device is determined according to the working mode feedback information.

In some embodiments, the method may further include that:

a device-to-device distance between the controlled electronic device and an electronic device in a same target network segment with the controlled electronic device is acquired;

or, when a position of the controlled electronic device is within a preset position range, a device-to-device distance between the controlled electronic device and another electronic device is acquired.

In some embodiments, detection of the starting operation over the controlled electronic device may include that:

an unlocking or wakeup operation over the controlled electronic device is detected;

or, an unlocking or wakeup operation over the controlled electronic device is detected and starting of the controlled electronic device responsive to the unlocking or wakeup operation is completed.

In some embodiments, the first preset working mode may include being in an audio file playing status, being in a video file playing status, being in a call status and being in a target APP running status.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for controlling an electronic device, comprising:
responsive to that a starting operation over a controlled electronic device is detected, determining a target electronic device at a distance that is within a preset distance away from the controlled electronic device;
determining a working mode of the target electronic device; and
responsive to that the working mode of the target electronic device is matched with a first preset working mode, adjusting a working mode of the controlled electronic device to a second preset working mode to avoid interference from the controlled electronic device to use of the target electronic device, wherein the first preset working mode comprises at least one of:
a working mode which is provided by the target electronic device and which enables an Application (APP) or a function, that produces sound when being triggered, to be silent or adjusted to a state not disturbing a user of the target electronic device when the target electronic device is locked; or,
a working mode of running a preset APP for enabling a sensitivity of the preset APP in running to an ambient noise to reach a preset degree.

2. The method of claim 1, wherein determining the target electronic device at the distance that is within the preset distance away from the controlled electronic device comprises:
determining at least one electronic device at a distance that is within the preset distance away from the controlled electronic device; and
determining at least one of the following as the target electronic device: a friend electronic device from the determined at least one electronic device a pre-registered smart device among the determined at least one electronic device,
wherein the friend electronic device is an electronic device which is preset in at least one preset APP and has a preset authority.

3. The method of claim 2, further comprising:
acquiring a device-to-device distance between the controlled electronic device and an electronic device in a same target network segment with the controlled electronic device;

or, acquiring a device-to-device distance between the controlled electronic device and another electronic device when a position of the controlled electronic device is within a preset position range.

4. The method of claim 1, wherein determining the target electronic device at the distance that is within the preset distance away from the controlled electronic device comprises:
  determining at least one electronic device at a distance that is within the preset distance away from the controlled electronic device; and
  determining, from the determined at least one electronic device, an electronic device meeting any one of following conditions as the target electronic device:
  for an account or a number in a login status in a contact list in a preset APP installed in the controlled electronic device, an electronic device where the preset APP corresponding to the account or the number is installed,
  an electronic device of which a frequency of contact or connection with the controlled electronic device meets a preset contact or connection frequency condition, and
  a smart device in an on status.

5. The method of claim 1, wherein determining the working mode of the target electronic device comprises:
  downloading, from a working mode server, working mode report information uploaded by the target electronic device, and determining the working mode of the target electronic device according to the working mode report information; or,
  receiving working mode broadcast information broadcast by the target electronic device, and determining the working mode of the target electronic device according to the working mode broadcast information; or,
  sending working mode request information to the target electronic device to request the target electronic device to return working mode feedback information in response to the working mode request information, and determining the working mode of the target electronic device according to the working mode feedback information.

6. The method of claim 1, further comprising:
  acquiring a device-to-device distance between the controlled electronic device and an electronic device in a same target network segment with the controlled electronic device;
  or, acquiring a device-to-device distance between the controlled electronic device and another electronic device when a position of the controlled electronic device is within a preset position range.

7. The method of claim 1, wherein detection of the starting operation over the controlled electronic device comprises:
  detecting an unlocking or wakeup operation over the controlled electronic device;
  or, detecting an unlocking or wakeup operation over the controlled electronic device and completing starting of the controlled electronic device responsive to the unlocking or wakeup operation.

8. A non-transitory computer-readable storage medium having instructions stored thereon for execution by a processor of a terminal to enable the terminal to implement operations of the method of claim 1.

9. The non-transitory computer-readable storage medium of claim 8, wherein the instructions are for further execution by the processor to enable the terminal to implement operations of:
  determining at least one electronic device at a distance that is within the preset distance away from the controlled electronic device; and
  determining at least one of the following as the target electronic device: a friend electronic device from the determined at least one electronic device or a pre-registered smart device among the determined at least one electronic device,
  wherein the friend electronic device is an electronic device which is preset in at least one preset APP and has a preset authority.

10. The non-transitory computer-readable storage medium of claim 8, wherein the instructions are for further execution by the processor to enable the terminal to implement operations of:
  determining at least one electronic device at a distance that is within the preset distance away from the controlled electronic device; and
  determining, from the determined at least one electronic device, an electronic device meeting any one of following conditions as the target electronic device:
  for an account or a number in a login status in a contact list in a preset APP installed in the controlled electronic device, an electronic device where the preset APP corresponding to the account or the number is installed,
  an electronic device of which a frequency of contact or connection with the controlled electronic device meets a preset contact or connection frequency condition, and
  a smart device in an on status.

11. The non-transitory computer-readable storage medium of claim 8, wherein the instructions are for further execution by the processor to enable the terminal to implement operations of:
  downloading, from a working mode server, working mode report information uploaded by the target electronic device, and determining the working mode of the target electronic device according to the working mode report information; or,
  receiving working mode broadcast information broadcast by the target electronic device, and determining the working mode of the target electronic device according to the working mode broadcast information; or,
  sending working mode request information to the target electronic device to request the target electronic device to return working mode feedback information in response to the working mode request information, and determining the working mode of the target electronic device according to the working mode feedback information.

12. The non-transitory computer-readable storage medium of claim 8, wherein the instructions are for further execution by the processor to enable the terminal to implement operations of
  acquiring a device-to-device distance between the controlled electronic device and an electronic device in a same target network segment with the controlled electronic device;
  or, acquiring a device-to-device distance between the controlled electronic device and another electronic device when a position of the controlled electronic device is within a preset position range.

13. The non-transitory computer-readable storage medium of claim 8, wherein the instructions are for further execution by the processor to enable the terminal to implement operations of:

detecting an unlocking or wakeup operation over the controlled electronic device;

or, detecting an unlocking or wakeup operation over the controlled electronic device and completing starting of the controlled electronic device responsive to the unlocking or wakeup operation.

14. An apparatus for controlling an electronic device, comprising:
a processor; and
a memory configured to store an instruction executable by the processor,
wherein the processor is configured to:
responsive to that a starting operation over a controlled electronic device is detected, determine a target electronic device at a distance that is within a preset distance away from the controlled electronic device;
determine a working mode of the target electronic device; and
responsive to that the working mode of the target electronic device is matched with a first preset working mode, adjust a working mode of the controlled electronic device to a second preset working mode to avoid interference from the controlled electronic device to use of the target electronic device, and wherein the first preset working mode comprises at least one of:
a working mode which is provided by the target electronic device and which enables an Application (APP) or a function, that produces sound when being triggered, to be silent or adjusted to a state not disturbing a user of the target electronic device when the target electronic device is locked; or,
a working mode of running a preset APP for enabling a sensitivity of the preset APP in running to an ambient noise to reach a preset degree.

15. The apparatus of claim 14, wherein the processor is further configured to:
determine at least one electronic device at a distance that is within the preset distance away from the controlled electronic device; and
determine at least one of the following as the target electronic device: a friend electronic device from the determined at least one electronic device or a pre-registered smart device among the determined at least one electronic device,
wherein the friend electronic device is an electronic device which is preset in at least one preset APP and has a preset authority.

16. The apparatus of claim 15, wherein the processor is further configured to:
acquiring a device-to-device distance between the controlled electronic device and an electronic device in a same target network segment with the controlled electronic device;
or, acquiring a device-to-device distance between the controlled electronic device and another electronic device when a position of the controlled electronic device is within a preset position range.

17. The apparatus of claim 14, wherein the processor is further configured to:
determine at least one electronic device at a distance that is within the preset distance away from the controlled electronic device; and
determine, from the determined at least one electronic device, an electronic device meeting any one of following conditions as the target electronic device:
for an account or a number in a login status in a contact list in a preset APP installed in the controlled electronic device, an electronic device where the preset APP corresponding to the account or the number is installed,
an electronic device of which a frequency of contact or connection with the controlled electronic device meets a preset contact or connection frequency condition, and
a smart device in an on status.

18. The apparatus of claim 14, wherein the processor is further configured to:
download, from a working mode server, working mode report information uploaded by the target electronic device, and determining the working mode of the target electronic device according to the working mode report information; or,
control a transceiver to receive working mode broadcast information broadcast by the target electronic device, and determining the working mode of the target electronic device according to the working mode broadcast information; or,
control a transceiver to send working mode request information to the target electronic device to request the target electronic device to return working mode feedback information in response to the working mode request information, and determining the working mode of the target electronic device according to the working mode feedback information.

19. The apparatus of claim 14, wherein the processor is further configured to:
acquiring a device-to-device distance between the controlled electronic device and an electronic device in a same target network segment with the controlled electronic device;
or, acquiring a device-to-device distance between the controlled electronic device and another electronic device when a position of the controlled electronic device is within a preset position range.

20. The apparatus of claim 14, wherein the processor is further configured to:
detecting an unlocking or wakeup operation over the controlled electronic device;
or, detecting an unlocking or wakeup operation over the controlled electronic device and completing starting of the controlled electronic device responsive to the unlocking or wakeup operation.

* * * * *